3,073,679
PRODUCTION OF SINGLE CRYSTAL BORON PHOSPHIDE

Bobbie D. Stone, Miamisburg, and Robert A. Ruehrwein, Dayton, Ohio, assignors to Monsanto Chemical Company, St. Louis, Mo., a corporation of Delaware
No Drawing. Filed June 29, 1959, Ser. No. 823,360
2 Claims. (Cl. 23—204)

The present invention relates to a new method for the production of a large single crystal form of boron phosphide. It is an object of this invention to provide a new and economical method for the production of boron phosphide characterized as having a cubic crystalline structure and existing as well defined elongated single crystals which are larger than those obtained in conventional methods. It is a further object to provide a method for the production of single crystals of boron phosphide from crude forms of boron phosphide whether amorphous or crystalline. Further objects and advantages of my invention will be apparent from the following description.

The present process for the production of a single crystal form of boron phosphide is based upon a chemical reaction which occurs when crude boron phosphide is volatilized in the presence of a hydrogen halide vapor. The hydrogen halides which are contemplated in the present invention include the group of hydrogen chloride, hydrogen bromide and hydrogen iodide; the preferred member being hydrogen chloride.

The crude boron phosphide which is employed as the source material in the present process may be of any desired purity. For example, in the preparation of an electronic grade of boron phosphide in which very large single crystals are desired, a relatively pure form of boron phosphide is desirably employed as the starting material. However, amorphous boron phosphide and other crude sources are also applicable in the present invention. The hydrogen halide gas may be used from a normal commercial supply such as from a cylinder or may be prepared by conventional chemical means. The chemical reaction involved in the present method is complex, but the hydrogen halide is definitely necessary in the process. The process differs from a single distillation or sublimation in that the vaporization is accomplished by a chemical reaction of boron phosphide with a hydrogen halide gas.

In order to carry out the present process resulting in a single crystal type of product, the crude boron phosphide is contacted in a high temperature zone in the presence of a hydrogen halide gas. The gas stream is then passed through a region of still higher temperature in which it is found that a gas phase precipitation takes place with the resultant production of a single crystal form of boron phosphide. The lower temperature zone in which the crude boron phosphide is first contacted with hydrogen halide gas is maintained at a temperature within the range of from 600° C. to 1,500° C., a preferred temperature range being from 800° C. to 1,200° C. The gas mixture from the first zone is then subjected to a region maintained at a higher temperature within the broad range of from 800° C. to 1,800° C., a preferred range being from 1,100° C. to 1,500° C. However, it is essential that a temperature differential be maintained between the respective higher and lower temperature zones, such increment of temperature being from 50° C. to 1,000° C., while a preferred increment is from 200° C. to 500° C.

The contacting and vapor phase precipitation may be carried out in either a closed system which is completely sealed off after the introduction of the hydrogen halide gas with the boron phosphide, or by use of a continuous gas flow system. The pressure which is obtained in a single-vessel, closed system corresponds to the pressure exerted by the added hydrogen chloride or other hydrogen halide vapor at the operating temperature. When employing a continuous gas flow system, the hydrogen halide gas is advantageously introduced at the rate of from 1 to 1,000 ml./min. The pressure which is maintained in the system may be varied over a considerable range such as from 1/100 to two or more atmospheres, a preferred range being from 1/2 to 1 atmosphere.

The term "single crystal" as employed in the present invention refers to crystalline material in which the said single crystals have gross physical dimensions such that at least one dimension of the crystalline product is at least 0.1 mm.

The apparatus employed in carrying out the process of the present invention may be of any of a number of types. The simplest type constitutes a closed tube of a refractory material such as glass, quartz or a ceramic such as mullite into which the boron phosphide is introduced together with the hydrogen halide vapor. The tube is then sealed off and subjected to the temperature conditions described above. The reaction time is not critical, and may be varied from a period of a minute or less to an hour or more. After the closed tube has thus been heated, it is cooled and opened to remove the single crystal form of boron phosphide which has precipitated from the gaseous reactants onto the walls of the tube.

On a larger scale, the present process is operated as a continuous flow system. This may constitute a simple tube in which the solid crude boron phosphide is located and over which source material the hydrogen halide gas is then passed. At the lower temperatures set forth above, the gas stream passes along the same or an additional conduit to another region maintained at a higher temperature. For example, a silica tube located in a multiple zone electric heating furnace may thus be employed to produce the desired first zone temperature followed by a higher temperature in which the precipitation from the vapor phase takes place to yield the single crystal form. The product is readily removed from the walls of the reactor since it is merely precipitated from the gas phase and deposited as a mass along the walls of the tube. Various other modifications including horizontal and vertical tubes are also possible, and recycle systems in which the exit gas after precipitation of the single crystal product is returned to the system are also desirable, particularly in larger scale installations.

Boron phosphide as herein prepared is a highly crystalline material with a cubic crystalline structure having a unit cell length of about 4.537 Angstrom units. Its hardness lies above 9 on Moh's scale (diamond=10). It has been found that it will scratch and abrade quartz, porcelain, agate, cemented tungsten carbide and sapphire. The crystalline material is quite light, having a particle density by the pycnometer method of 2.94 (theoretical, 2.97).

The crystalline form of boron phosphide is resistant to oxidation when exposed for two minutes to an oxy-hydrogen flame giving a temperature of 4,000° F. In addition it has been found that a sample at this temperature can be subjected to an oxygen jet from a cutting torch without appreciable deterioration of the crystalline boron phosphide.

While this material is somewhat less resistant to oxidation while it is being heated up to such high temperatures, the provision of a neutral or reducing atmosphere overcomes any such tendency towards deterioration. When exposed to a flame at 2,100° F. in air, it will not burn. A thin coating apparently forms on the exposed surface, which coating protects the boron phosphide at these high temperatures. The melting point of this material is extremely high, but from theoretical considerations it should melt at a temperature greater than about 5,400° F.

Cubic crystalline boron phosphide is not attacked by any liquid reagent which has been tried. It is completely stable to boiling nitric acid and to boiling aqua regia.

The following examples illustrate specific embodiments of the present invention.

*Example 1*

A sample of polycrystalline boron phosphide is placed in a quartz boat contained in a quartz tube placed in two adjoining electric furnaces with the sample located in the center of one of the furnaces. The furnace surrounding the sample is heated to 900° C. and the second furnace heated to 1,200° C. while dry hydrogen chloride gas is passed through the tube at a rate of about 2 ml./min. The purified boron phosphide is deposited on the walls of the quartz tube in the 1,200° zone in the form of elongated transparent red crystals. They are removed from the quartz walls by mechanical scraping, and found to be composed of a single crystal form of boron phosphide.

*Example 2*

When the process of Example 1 is modified by the use of hydrogen bromide gas instead of hydrogen chloride, a similar product is obtained.

What is claimed is:

1. Process for the production of single crystals of boron phosphide which comprises contacting a crude source of boron phosphide with a hydrogen halide vapor at a temperature in the range of from 600° C. to 1,500° C., and subjecting the resulting gas mixture to a region of higher temperature within the range of from 800° C. to 1,800° C., with a temperature increase from the first zone to the second zone of from 50° C. to 1,000° C., whereby a single crystal form of boron phosphide is deposited in the said second zone.

2. Process for the production of single crystals of boron phosphide which comprises contacting a crude source of boron phosphide with hydrogen chloride vapor at a temperature in the range of from 800° C. to 1,200° C., and subjecting the resulting gas mixture to a region of higher temperature within the range of from 1,100° C. to 1,500° C., with a temperature increase from the first zone to the second zone of from 200° C. to 500° C. whereby a single crystal form of boron phosphide is deposited in the said second zone.

References Cited in the file of this patent

Van Wazer: "Phosphorus and its Compounds," vol. 1, Chemistry, pages 146 and 147 (1958).

Popper: "Nature," vol. 179, pages 1075, 1957.

Lawson: "Preparation of Single Crystals," 1958, pages 90 and 91.